(12) United States Patent
Sharma et al.

(10) Patent No.: US 11,796,452 B2
(45) Date of Patent: Oct. 24, 2023

(54) CATHODIC CURRENT MEASUREMENT OF OUTER CASINGS OR TUBULARS USING ELECTRO-MAGNETIC RADIATION

(71) Applicant: Saudi Arabian Oil Company, Dhahran (SA)

(72) Inventors: Hemant Kumar Sharma, Udhailiyah (SA); Abdulrahman K. Mulhim, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/518,840

(22) Filed: Nov. 4, 2021

(65) Prior Publication Data

US 2023/0133067 A1    May 4, 2023

(51) Int. Cl.
*E21B 41/02*    (2006.01)
*G01N 17/02*    (2006.01)
(Continued)

(52) U.S. Cl.
CPC ............. *G01N 17/02* (2013.01); *E21B 41/02* (2013.01); *E21B 47/00* (2013.01); *G01V 3/28* (2013.01)

(58) Field of Classification Search
CPC ........ G01N 17/02; G01N 17/04; E21B 41/02; E21B 47/00; E21B 47/006; G01V 3/28;
(Continued)

(56) References Cited

U.S. PATENT DOCUMENTS

| 2016/0090662 A1* | 3/2016 | Capulong | .............. | C25D 21/12 |
| | | | | 204/229.1 |
| 2019/0353010 A1* | 11/2019 | Ross | ........................ | E21B 47/06 |
| 2020/0284115 A1* | 9/2020 | Delgado | .................. | E21B 29/02 |

FOREIGN PATENT DOCUMENTS

AU    2016204619    7/2016

OTHER PUBLICATIONS slb.com [online], "CPET Corrosion protection evaluation tool," 2004, retrieved Oct. 13, 2021 from URL<https://www.slb.com/-/media/files/production/product-sheet/cpet-ps>, 2 pages.
(Continued)

*Primary Examiner* — Tarun Sinha
*Assistant Examiner* — James I Burris
(74) *Attorney, Agent, or Firm* — Fish & Richardson P.C.

(57) ABSTRACT

A method for determining a cathodic current (such as from a cathodic protection system) in a tubular disposed within a wellbore drilled in a subterranean zone. A electromagnetic tool disposed within the tubular includes an electromagnetic transmitter, an electromagnetic receiver, a helical transmitter coil, and a helical receiver coil. An axis of the helical transmitter coil and an axis of the helical receiver coil are substantially parallel to an axis of the tubular. An electromagnetic field is transmitted by flowing a first electrical current to the helical transmitter coil. During the transmitting, an electromagnetic signal is received by the electromagnetic receiver via the helical receiver coil. A second electrical current is calculated based on the electromagnetic signal received by the electromagnetic receiver. A magnitude of the cathodic current flowing through the tubular is calculated based on a difference between the first electrical current and the second electrical current.

5 Claims, 4 Drawing Sheets

(51) Int. Cl.
*E21B 47/00* (2012.01)
*G01V 3/28* (2006.01)

(58) Field of Classification Search
CPC ... G01V 3/18; G01V 3/26; G01V 3/30; G01V 3/20; G01V 3/22; G01V 3/24
See application file for complete search history.

(56) References Cited

OTHER PUBLICATIONS

Vrss.bz [online], "Well integrity diagnostics," 2018, retrieved Oct. 13, 2021 from URL<https://www.vrss.bz/wp-content/uploads/2018/04/VRSS_brochure_2018.pdf>, 8 pages.

Wilt et al., "Casing integrity mapping using top-casing electrode and surface based electromagnetic fields," Geophysics, 2019, 51 pages.

* cited by examiner

CATHODIC CURRENT MEASUREMENT OF OUTER CASINGS OR TUBULARS USING ELECTRO-MAGNETIC RADIATION

TECHNICAL FIELD

This disclosure relates generally to cathodic protection of tubular components in subterranean wells.

BACKGROUND

In hydrocarbon production, a wellbore is drilled into a hydrocarbon-rich geological formation. After the wellbore is partially or completely drilled, a completion system is installed to secure the wellbore in preparation for production or injection. The completion system can include a series of casings or liners cemented in the wellbore to help control the well and maintain well integrity.

Cathodic protection is a useful technique to reduce or minimize corrosion of casing and other metallic components in subterranean wells. In cathodic protection, the casing or other metallic component is connected to another object (such as a metal object), such that the component acts as a cathode and the other object acts as an anode in what is essentially an electrochemical cell. The anode component thus corrodes instead of the protected component. In an impressed cathodic protection system, an external DC electrical power source is attached to the anode to help drive the protective electrochemical reaction.

SUMMARY

Certain aspects of the subject matter herein can be implemented as a method for determining a cathodic current in a tubular disposed within a wellbore drilled in a subterranean zone. The cathodic current can be an electrical current impressed in the tubular by a cathodic protection system. The method includes disposing an electromagnetic tool within the tubular. The electromagnetic tool includes an electromagnetic transmitter, an electromagnetic receiver, a helical transmitter coil, and a helical receiver coil. An axis of the helical transmitter coil and an axis of the helical receiver coil are substantially parallel to an axis of the tubular. An electromagnetic field is transmitted by flowing a first electrical current to the helical transmitter coil. During the transmitting of the electromagnetic field, an electromagnetic signal is received by the electromagnetic receiver via the helical receiver coil. A second electrical current is calculated based on the electromagnetic signal received by the electromagnetic receiver. A magnitude of the cathodic current flowing through the tubular is calculated based on a difference between the first electrical current and the second electrical current.

An aspect combinable with any of the other aspects can include the following features. The electromagnetic tool is not in contact with the tubular.

An aspect combinable with any of the other aspects can include the following features. The tubular can be a first tubular. A second tubular can be disposed within the first tubular. Disposing the electromagnetic tool within the first tubular can include disposing the electromagnetic tool within the second tubular disposed within the first tubular.

An aspect combinable with any of the other aspects can include the following features. The cathodic current can have a magnitude of about 40 amperes.

An aspect combinable with any of the other aspects can include the following features. The cathodic current can have a magnitude of about 100 milliamperes.

An aspect combinable with any of the other aspects can include the following features. The first tubular can be a production casing and the second tubular can be a production tubing.

An aspect combinable with any of the other aspects can include the following features. The transmitter and the receiver can be communicatively coupled to a control module. The control module can include one or more processors and a non-transitory computer readable medium storing instructions executable by the one or more processors to perform computer operations. The operations can include transmitting a command to the tool to transmit the electromagnetic field. The operations can also include the determining of the magnitude of the cathodic current flowing through the tubular based on the difference between the first electrical current and the second electrical current.

An aspect combinable with any of the other aspects can include the following features. The operations can further include outputting to an operator the magnitude of the cathodic current determined by the control module.

Certain aspects of the subject matter herein can be implemented as cathodic protection and measurement system. The system includes a tubular disposed within a wellbore drilled in a subterranean zone, and a cathodic anode disposed within the subterranean zone and connected to the tubular, such that a cathodic protection circuit for the tubular is formed. An electromagnetic tool is disposed within the tubular that includes an electromagnetic transmitter, an electromagnetic receiver, a helical transmitter coil, and a helical receiver coil. An axis of the helical transmitter coil and an axis of the helical receiver coil are substantially parallel to an axis of the tubular. The system also includes a control module communicatively coupled to the electromagnetic tool. The control module includes one or more processors and a non-transitory computer readable medium storing instructions executable by the one or more processors to perform computer operations. The operations include transmitting an electromagnetic field by flowing a first electrical current to the helical transmitter coil. The operations also include receiving, by the electromagnetic receiver via the helical receiver coil, an electromagnetic signal during the transmitting of the electromagnetic field. A second electrical current is calculated based on the electromagnetic signal received by the electromagnetic receiver. A magnitude of the cathodic current flowing through the tubular is calculated based on a difference between the first electrical current and the second electrical current.

An aspect combinable with any of the other aspects can include the following features. The electromagnetic tool is not in contact with the tubular.

An aspect combinable with any of the other aspects can include the following features. The tubular is a first tubular disposed and wherein a second tubular is disposed within the first tubular, and wherein the electromagnetic tool is disposed within the second tubular disposed within the first tubular.

An aspect combinable with any of the other aspects can include the following features. The operations can include outputting the determined magnitude of the cathodic current to an operator.

An aspect combinable with any of the other aspects can include the following features. The cathodic current can have a magnitude of about 40 amperes.

An aspect combinable with any of the other aspects can include the following features. The cathodic current can have a magnitude of about 100 milliamperes.

An aspect combinable with any of the other aspects can include the following features. The first tubular can be a production casing and the second tubular can be a production tubing.

The details of one or more embodiments are set forth in the accompanying drawings and the description below. Other features, objects, and advantages will be apparent from the description and drawings, and from the claims.

DETAILED DESCRIPTION

A cathodic protection system is used for reduction or prevention of corrosion of a metal surface by making the casing cathodic with impressed currents or using sacrificial anode. Cathodic protection can be defined as reduction or prevention of corrosion of a metal surface by making it cathodic with impressed currents. For well casing, this can be accomplished with direct current (DC) electricity from an external source to oppose the discharge of current from anodic areas of the casing immersed in soil or saltwater. Corrosion caused by DC flow from anodic to cathodic areas on the same structure through an electrolyte is electrochemical in nature. The cathodic process is fundamentally an electrochemical method of redirecting corrosion from the surface of a critical structure, such as a well casing, to the surface of a structure that has been installed and designed to corrode. The structure installed to corrode has the basic property of a slow corrosion rate and is most typically made from a cast iron alloy having 14.5% silicon and other alloying elements. Anodes made from carbon or graphite are also used as an anode, which has a slow corrosion rate. Cathodic protection does not eliminate corrosion but transfers it from the structure under protection and concentrates the corrosion at another known location where the current discharging anode(s) can be designed for maximum life and ease of replacement.

In order to ensure sufficient protection, it is important that the element being protected has sufficient current flow. Various tools are available in the market which provides the measurement of cathodic current in wellbore casing. Such tools typically require direct contact of the measuring tool with the inner production tubular or casing and thus only directly measure the current in that inner casing or tubular. Such methods do not provide for quantitative measurement of current flow in casings or tubulars (such as intermediate or outer casing) that may be external to that inner casing or production tubular.

In accordance with an embodiment of the present disclosure, a cathodic current flowing through an outer tubular or casing can be measured using a tool disposed within an inner tubular or casing. Thus, the system and method of the present disclosure can enable cathodic current measurement of a casing or other tubular where direct contact with the tubular is not possible or practical.

Figure 1:
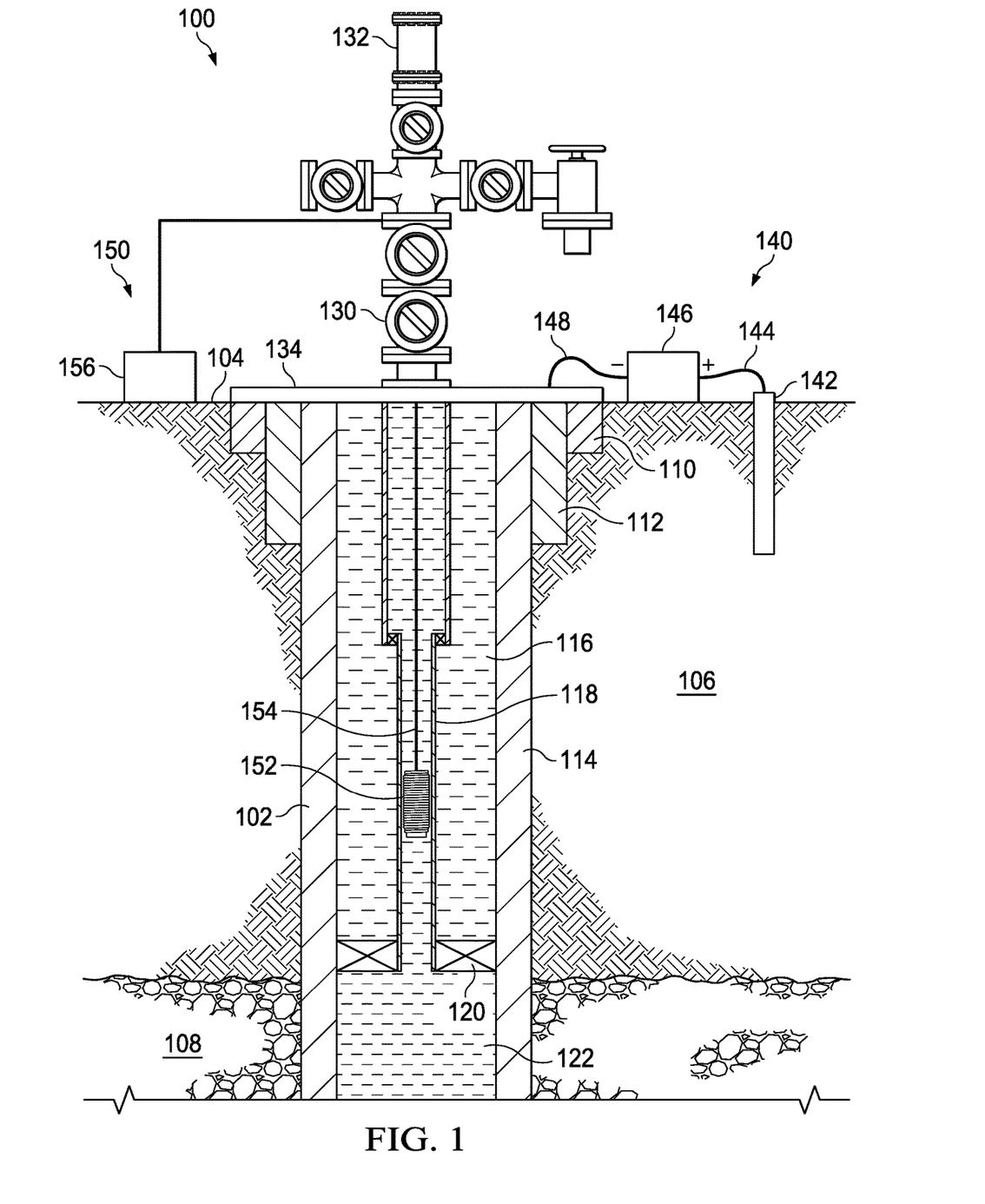
FIG. 1 is a schematic illustrations of a wellbore system including a cathodic current measurement system in accordance with an embodiment of the present disclosure.

FIG. 1 is a schematic illustrations of a wellbore system including a cathodic protection system and a cathodic current measurement system in accordance with an embodiment of the present disclosure. Wellbore system 100 comprises a wellbore 102 drilled into a subterranean zone 106 from surface 104. After wellbore 102 is partially or completely drilled, a completion system is installed to secure the wellbore in preparation for production or injection. The completion system can include a series of casings or liners cemented in the wellbore to help control the well and maintain well integrity. In some embodiments, one, some, or all of the casings and liners can be metallic, in whole or in part. In the illustrated embodiment, a surface casing 112 is installed within conductor casing 110. Production casing 114 is installed within surface casing 112 and extends down to producing reservoir 108, and can be perforated so as to allow produced fluids to flow into the cased wellbore.

Production tubing 118 is positioned within production casing 114 and provides a passageway through which produced fluid 122 from producing reservoir 108 can reach the surface 104. Production tubing 118 can in some embodiments be a metallic tubing, in whole or in part. A production packer 120 anchors and isolates the bottom of the production tubing 118. The inner surface of production casing 114 and the outer surface of production tubing 118 define a tubing-casing annulus 116, which is typically filled with a non-corrosive fluid. A Christmas tree 130 on surface 104 at the wellhead includes various valves used to regulate flow into or out of wellbore 102, including lubricator/pressure control equipment 132.

System 100 further includes a cathodic protection system 140 which includes cathodic protection anode 142 sunk partially below the surface 104. In the illustrated embodiment, cathodic protection system 140 is configured to provide cathodic protection to casings 110, 112, and 114. A DC current source 146 provides impressed current to cathodic protection system 140. Specifically, wire 144 connects the DC current source 146 to anode 142, and wire 148 connects DC current source 146 to a flange 134 of Christmas tree 130, with flange 134 being in conductive connection with casings 110, 112, and 114. Wires 144 and 148 can be a copper wire or other suitable wire. In this way, cathodic current flows through casings 110, 112, and 114 to anode 142, effectively reducing or eliminating corrosion in casing 110, 112, and 114 and instead promoting corrosion in anode 142. In some embodiments, the current can range from around 40 amperes (for example, at or near the uphole end of the casing) to around 100 milliamperes (for example, at or near the downhole end of the casing).

System 100 further includes a cathodic current measurement system 150 to monitor the cathodic current flowing through casings 110, 112, and 114 and thereby monitor the function and activity of cathodic protection system 140. Cathodic current measurement system 150 includes a control module 156 and an electromagnetic transmitter/receiver tool (EM tool) 152 disposed within production tubing 118 (or, if the well is tubingless, within inner casing 114). EM tool 152 is connected to control module 156 via a wireline 154 or another suitable wired or wireless connection. Control module 156 can be (or can include) a computer system that comprises one or more processors, and a computer-readable medium (for example, a non-transitory computer-readable medium) storing computer instructions executable by the one or more processors to perform operations. In some embodiments, control module 156 is at the wellsite proximate to Christmas tree 130 and other wellsite equipment. In other embodiments, control module 156 can be remote from the wellsite. In some embodiments, control module 156 can be in communication with (or can be a component part of) other remote or wellsite monitoring and control systems. Control module 156 can, in some embodiments, be (or comprise or be a component of) programmable logic controller (PLC) module 500 of FIG. 5.

Figure 2:
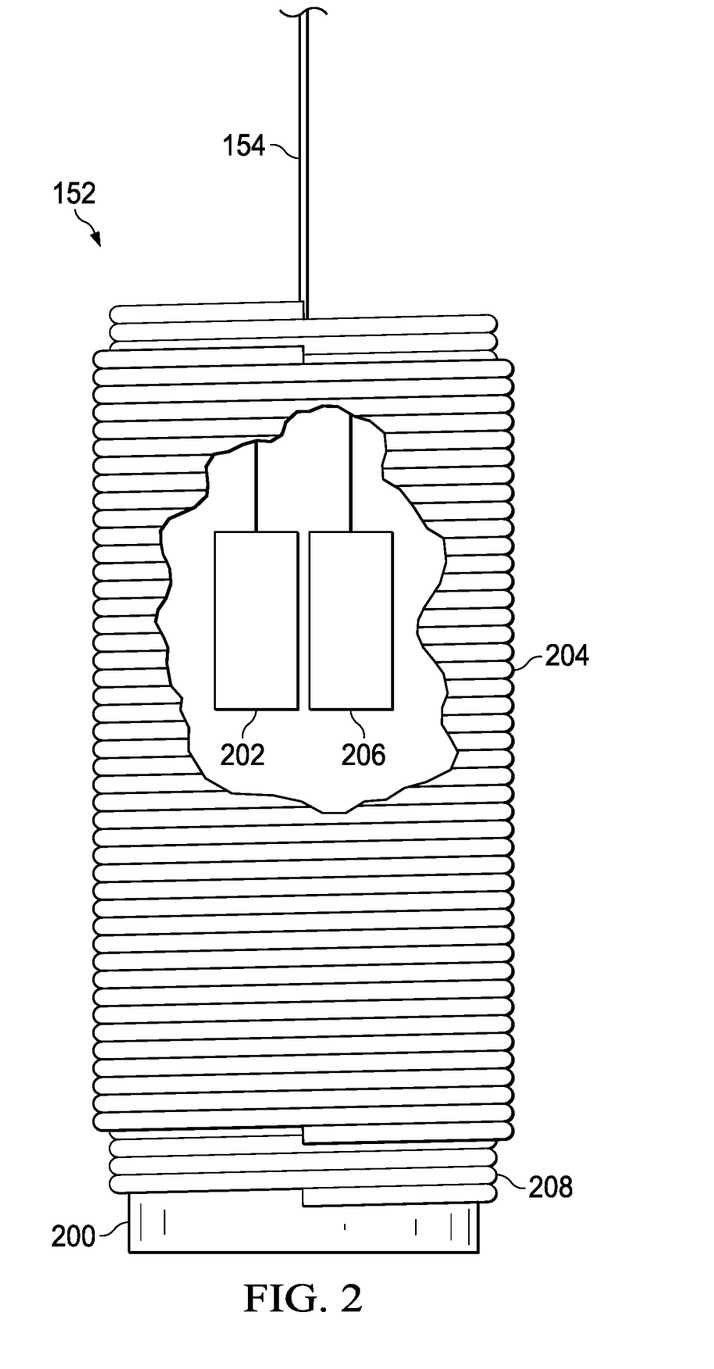
FIG. 2 is a schematic illustration of an EM transmitter/receiver tool in accordance with an embodiment of the present disclosure.

As shown in FIG. 2, EM tool 152 in some embodiments includes a main body 200, an electromagnetic transmitter 202, and a transmitter coil 204. In some embodiments, tool 152 is in the shape of a tube and transmitter coil 204 can in some embodiments be a helical coil with an axis parallel to the axis of tool 152, such that the axis of the transmitter coil is likewise parallel to the axis of production tubing 118 and production casing 114. Tool 152 can also include a receiver 206 and a receiver coil 208. Like transmitter coil 204, receiver coil 208 can in some embodiments be a helical coil with an axis parallel to the axis of tool 152, such that the axis of the transmitter coil is likewise parallel to the axis of production tubing 118 and production casing 114.

Transmitter 202 can in some embodiments be an electromagnetic field generator to generate electromagnetic field cloud with EM current of around 1.2 amperes. Receiver 206 can be an electromagnetic field receiver with facility to magnify amplitude of received current which can be configured to detect current differentials of around 50 to 100 milliamperes. In some embodiments, power can be transmitted to tool 152 via wireline 154. In some embodiments, in addition or alternatively, tool 152 can obtain power from an on-board battery or via another suitable source.

Figure 3:
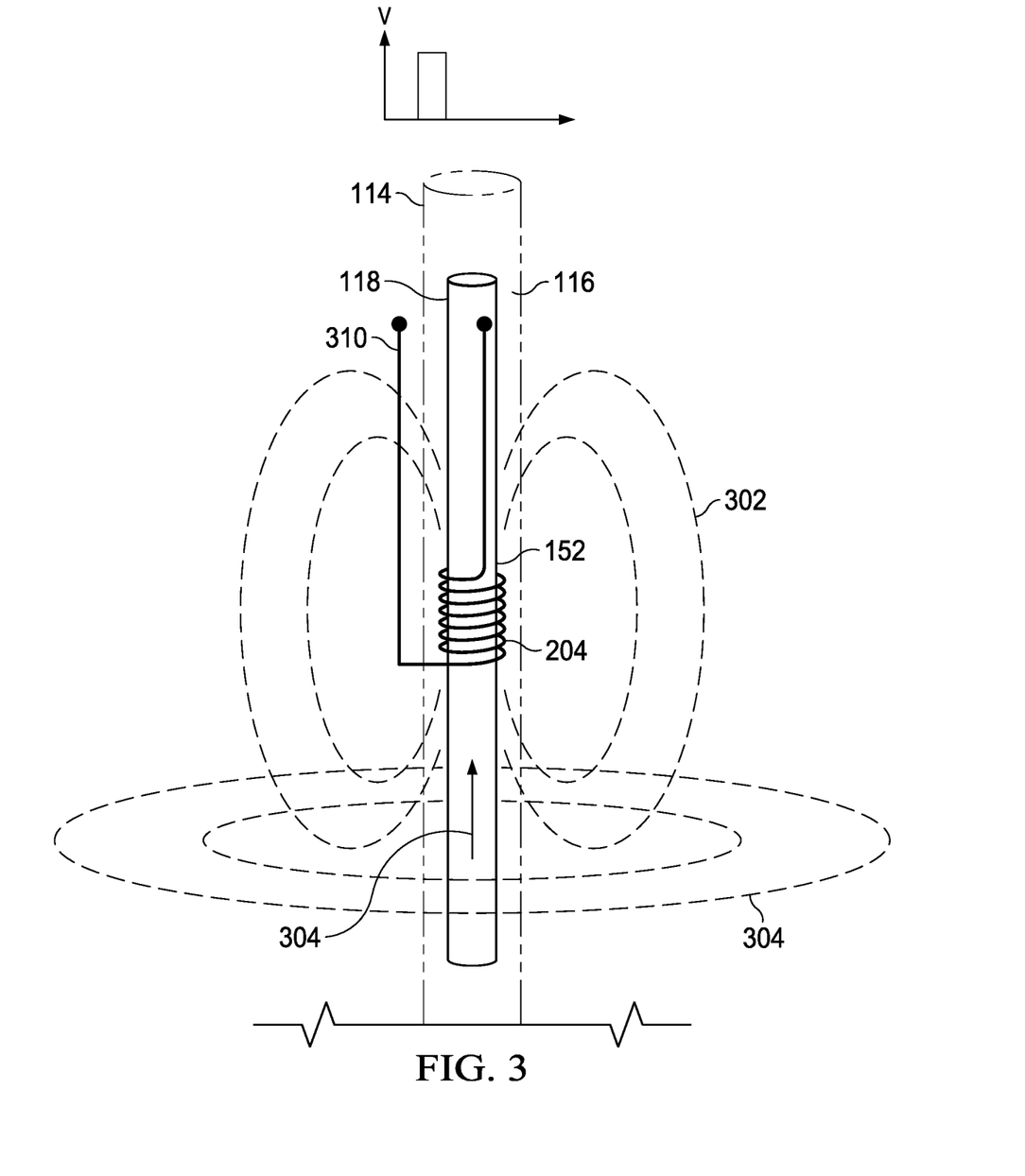
FIG. 3 is a schematic illustration of measurement of cathodic current in a well casing using the system of the present disclosure.

FIG. 3 illustrates EM tool 152 positioned within a wellbore (such as, for example, within wellbore 102 as shown in FIG. 1). EM tool 152 can transmitting DC voltage via an electrical pulse 310 to transmitter 202 (FIG. 2) which can create, via transmitter coil 204, an electromagnetic field 302 due to the Hall effect. Electromagnetic field 302 in turn induces an induced electrical current (304) in the surrounding casing. Receiver 206 receives, via receiver coil 208, an electromagnetic measurement that is attributable to both the current induced by the electromagnetic field from the transmitter and the electromagnetic field generated by any current flowing through a surrounding casing due to the cathodic protection system. A control module (for example, control module 156 of FIG. 1) can convert the received magnetic field measurements to current and calculate the difference between the transmitted current and the received current. Control module 156 determines the magnitude (amperage) of the current through the casing due to the cathodic protection system based on the difference between the transmitted current and the received current.

For example, referring to FIGS. 1 and 2, in response to the input, control module 156 transmits a command or instruction to transmitter 202 to transmit the EM field, to conduct the above calculations based on measurements received by receiver 206, and to an output the results to the user. Because production tubing 118 is isolated from the cathodic protection system by the fluid in tubing-casing annulus 116, and therefore only casings 110, 112, and 114 are connected to cathodic protection system 140, it is assumed that any voltage difference detected between the first and second voltage is attributable to the cathodic current in casings 110, 112, and 114. In this way, cathodic current can thus be measured by tool 152 notwithstanding that tool 152 is disposed within production tubing 118 and not in contact with casings 110, 112, and 114. If no voltage difference is detected, a null/zero cathodic current measurement is outputted to the operator, and it is assumed that there is no cathodic current flow in production casing 114.

The real-time measurement will help to confirm the effectiveness of the cathodic protection program and identify remedial surface current adjustments while the tool is in the wellbore. The surface current (for example, from current source 146 of FIG. 1) can be increased or decreased (for example, via a command from control module 156) as per requirement of the cathodic current reach to the desired depth and to protect the casing system from corrosion to the required degree.

Figure 4:
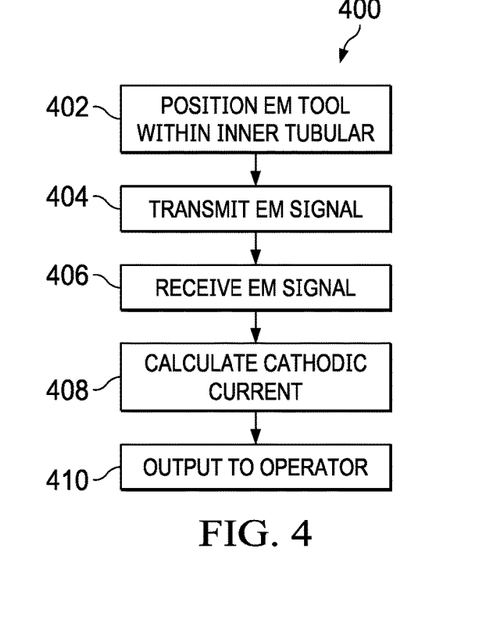
FIG. 4 process flow diagram of a method of measurement of cathodic current in a well casing in accordance with an embodiment of the present disclosure.

FIG. 4 process flow diagram of a method of measurement of cathodic current in a well casing in accordance with an embodiment of the present disclosure. A can be utilized, for example, in a situation as shown in FIG. 1, where cathodic current is an electrical current impressed in first tubular (such as a casing) as part of a cathodic protection system, and where a second, inner tubular (such as a production tubing) is positioned within the first tubular, such that directed contact with the first (outer) tubular is not possible or practical.

Referring to FIG. 4, method 400 begins at step 402 in which an electromagnetic tool is disposed within the inner tubular. The electromagnetic tool can in some embodiments be a tool as shown in FIG. 2, including an electromagnetic transmitter and an electromagnetic receiver. As shown in FIG. 2, the tool can include a helical transmitter coil and a helical receiver coil, each with its axis parallel to the outer tubular (and, in some embodiments, parallel with the tool body).

At step 404, the EM tool transmits an electromagnetic field. As described above in reference to FIG. 3, the electromagnetic field in turn induces an induced electrical current in the surrounding casing. At step 406, the receiver receives an electromagnetic measurement that is attributable to both the electromagnetic field due to the transmitter and the electromagnetic field generated by any current flowing through a surrounding casing due to the cathodic protection system. At step 408, a control module converts the magnetic field measurements to current and calculates the magnitude (amperage) of the cathodic current based on the difference between the transmitted current and the received current. At step 410, the measurement is outputted to the operator.

Figure 5:
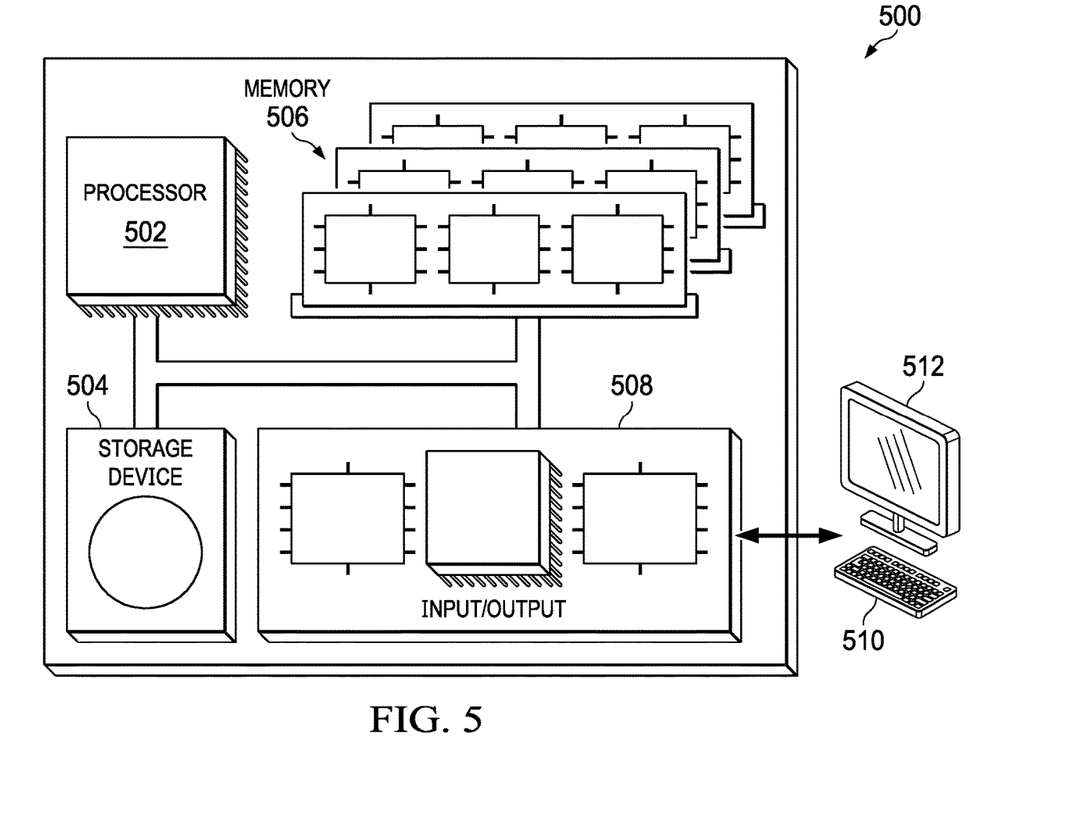
FIG. 5 is a schematic illustration of a programmable logic controller module in accordance with an embodiment of the present disclosure.

FIG. 5 is a schematic illustration showing an example PLC module 500 for operating the cathodic current protection and cathodic current measurement systems of the present disclosure. In some implementations, PLC module 500 includes one or more processors 502, one or more storage devices 504, memory 506, input/output modules 508, input devices 510, and output devices 512. Input devices 510 can include, for example, some or all of a user interface such as a user keyboard or touch screen (not shown) and a receiver on a downhole tool such as tool 152 of FIG. 1, and other suitable input devices. Output devices can include, for example, some or all of a user display screen (not shown), a transmitter on a downhole tool such as tool 152 of FIG. 1, and a cathodic current transmitter such as current source 146 of FIG. 1, and other suitable output devices.

PLC module 500 can include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The processor can be configured to process instructions for execution within the PLC module and can be designed using any of a number of architectures such as a complex instruction set computers processor, a reduced instruction set computer processor, or a minimal instruction set computer processor. The processor can either be a single-threaded processor or a multi-threaded processor and can be capable of processing instructions stored in the memory or on the storage device to display graphical information for a user interface on the input/output device.

The memory can store information within the PLC module and can be a computer readable medium, a volatile memory unit, or a non-volatile memory unit. The storage device can provide mass storage for the PLC module. The processor and the memory can also be supplemented by, or incorporated in, ASICs (application-specific integrated circuits). Similarly, the storage unit can be a computer-readable medium, a floppy disk device, a hard disk device, an optical disk device, a tape device, flash memory, a solid state device (SSD), or a combination. The features described can be implemented in digital electronic circuitry, or in computer hardware, firmware, software, or in combinations of them.

The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly in a computer to perform a certain activity or bring about a certain result. A computer program can be written in any form of programming language, including compiled or interpreted languages.

The computer program can be deployed in any form, including as a stand-alone program or as a module, component, subroutine, or other unit suitable for use in a computing environment. The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for protecting a production casing disposed within a wellbore drilled in a subterranean zone from corrosion, the method comprising:
   impressing, from a DC current source, a surface cathodic protection current from the production casing to a sacrificial anode disposed within the subterranean zone;
   disposing an electromagnetic tool within a production tubing disposed within the production casing, the electromagnetic tool not in contact with the production casing when disposed in the production tubing and comprising an electromagnetic transmitter, an electromagnetic receiver, a helical transmitter coil, and a helical receiver coil, wherein an axis of the helical transmitter coil and an axis of the helical receiver coil are substantially parallel to an axis of the tubular;
   transmitting, by flowing an electrical current to the helical transmitter coil while the tool is in the wellbore, an electromagnetic field;
   calculating an electrical current flowing in the production casing while transmitting the electromagnetic field based on an electromagnetic signal received by the electromagnetic receiver while transmitting the electromagnetic field;
   determining a difference between the electrical current flowed to the helical transmitter coil and the calculated electrical current flowing in the production casing while transmitting the electromagnetic field; and in response to determining that there is no cathodic current flow in the production casing at a desired depth based on a determination, while the tool is disposed in the wellbore, that the difference between the electrical current flowed to the helical transmitter coil and the calculated electrical current flowing in the production casing while transmitting the electromagnetic field is null/zero, initiating a remedial cathodic current adjustment by increasing the surface cathodic protection current impressed by the DC current source to the sacrificial anode such that the difference between the electrical current flowed to the helical transmitter coil and the calculated electrical current flowing in the production casing while transmitting the electromagnetic field is not null/zero.

2. The method of claim 1, wherein the surface cathodic protection current has a magnitude of about 40 amperes.

3. The method of claim 1, wherein the surface cathodic protection current has a magnitude of about 100 milliamperes.

4. The method of claim 1, wherein the transmitter and the receiver are communicatively coupled to a control module comprising:
   one or more processors; and
   a non-transitory computer readable medium storing instructions executable by the one or more processors to perform computer operations;
   and wherein the operations comprise:
   transmitting a command to the tool to transmit the electromagnetic field; and
   the determining of the difference between the electrical current flowed to the helical transmitter coil and the calculated second electrical current flowing in the production casing while transmitting the electromagnetic field.

5. The method of claim 4, wherein the operations further comprise outputting to an operator the difference between the first electrical current flowed to the helical transmitter coil and the calculated second electrical current flowing in the production casing while transmitting the electromagnetic field.

* * * * *